US005228711A

United States Patent [19]

Summers

[11] Patent Number: 5,228,711

[45] Date of Patent: Jul. 20, 1993

[54] TRAY ASSEMBLY FOR WHEEL CHAIRS

[76] Inventor: Thomas T. Summers, 1313 Lincoln, Apt. 501, Eugene, Oreg. 97401

[21] Appl. No.: 830,295

[22] Filed: Jan. 31, 1992

[51] Int. Cl.[5] .............................................. B60R 9/00

[52] U.S. Cl. ................................ 280/304.1; 297/161; 297/DIG. 4

[58] Field of Search .......................... 280/304.1, 250.1; 297/DIG. 4, 174, 173, 161

[56] References Cited

U.S. PATENT DOCUMENTS

| | | | |
|---|---|---|---|
| 4,436,339 | 3/1984 | Albers | 297/DIG. 4 |
| 4,566,732 | 1/1986 | Ostergoard, II et al. | 297/DIG. 4 |
| 4,679,756 | 7/1987 | Wood | 297/161 |
| 4,705,287 | 11/1987 | Cumbie | 280/304.1 |
| 4,753,449 | 6/1988 | Doucet | 280/304.1 |
| 4,779,883 | 10/1988 | Paduano et al. | 280/304.1 |
| 4,779,884 | 10/1988 | Minati | 280/304.1 |
| 4,867,506 | 9/1989 | Chavez | 297/188 |
| 4,878,685 | 11/1989 | Bahm | 280/304.1 |
| 5,040,813 | 8/1991 | Cumbie | 280/304.1 |
| 5,118,127 | 6/1992 | Partington | 280/304.1 |

*Primary Examiner*—Robert J. Oberleitner
*Assistant Examiner*—Kevin Hurley
*Attorney, Agent, or Firm*—John F. Ingman

[57] ABSTRACT

A tray assembly for wheel chairs incorporates a pair of trays, capable of relative planar movement, which are rotatingly mounted upon a horizontal support member which is, in turn, rotatable about the vertical axis of a vertical support member mounted upon the wheel chair. A tubular vertical mounting post may be fixed within a vertical wheel chair frame opening, utilizing a stem connecting member, or, alternatively, may be externally clamped to the frame of the wheel chair. A tubular vertical support member telescopically fits about and is releasably clamped to the mounting post, to permit both vertical adjustment and rotation about a vertical axis. A horizontal support member continues from the upper end of the vertical support member. A tray mounting plate is attached at the horizontal support member by a releasable clamping means, permitting rotation about a horizontal axis. A first tray is slidingly attached to the tray mounting plate by means of a pair of parallel longitudinally-grooved members, affixed to the underside of the first tray, which engage opposing edges of the tray mounting plate. A second tray may be similarly attached to the first tray, whereby the second tray may move orthogonally to the first tray, thereby providing four-direction planar adjustment of the second tray upon the tray mounting plate.

17 Claims, 3 Drawing Sheets

TRAY ASSEMBLY FOR WHEEL CHAIRS

BACKGROUND OF THE INVENTION

1. Field of the Invention

The present invention involves a tray assembly for wheel chairs, and, more particularly, a tray assembly which is removably attached to and supported by a conventional wheel chair where the tray position is horizontally, vertically and rotationally adjustable.

2. Description of the Prior Art

Certain mountings have been previously invented to support trays upon wheel chairs. U.S. Pat. Nos. 4,705,287; 4,779,884; and 4,878,685 provide recent examples of the prior art. The previous tray assemblies for wheel chairs have certain limitations in use. What is needed is a universal tray assembly for wheel chairs which has the following characteristics:

a. Supporting post or posts may be installed within wheel chair frame openings or externally clamped upon the wheel chair frame.

b. The tray may be supported from either the right or left side of the wheel chair; when maximum support is required, the tray may utilize support from both sides of the wheel chair.

c. The tray swings horizontally out of the way.

d. The tray is vertically adjustable.

e. Various sizes of trays may be used f. Tray positions are adjustable both front-to-rear and side-to-side, as well as being rotationally adjustable about a horizontal axis.

g. The tray assembly is self-storing without disconnection from the wheel chair.

SUMMARY OF THE INVENTION

The present invention provides a tray assembly for wheel chairs which is designed to meet the aforementioned needs. A tray assembly is utilized which incorporates a pair of trays, capable of relative planar movement, which are rotatingly mounted upon a horizontal support member which is, in turn, rotatable about the vertical axis of a vertical support member mounted upon the wheel chair.

Accordingly, in the preferred embodiment, a tubular vertical mounting post may be fixed within a vertical wheel chair frame opening, as available in many conventional wheel chairs, utilizing a stem connecting member. Alternatively, a tubular vertical mounting post may be externally clamped to the frame of the wheel chair. A tubular vertical support member, which telescopically fits about the mounting post, is clamped to the mounting post, said clamping being readily releasable by a user to permit both vertical adjustment of the vertical support member as well as rotation about its vertical axis, the latter permitting the tray to be horizontally swung out of a normal central location by the user. A horizontal support member is attached at the upper end of the vertical support member, the preferred embodiment utilizing a tray support member in the form of a 90-degree tubular elbow as a single structure with vertical and horizontal support members. A tray mounting plate is attached at the horizontal support member by clamping means which also are readily releasable, so as to permit the tray mounting plate to rotate about the horizontal axis of the horizontal support member. This rotational capability permits the tray mounting plate, and thus a tray, to be tilted to an inclined position as desired. One or more fixed horizontal or inclined positions may be provided as an alternative to the continuous clamping means.

A first tray, or undertray, may be slidingly attached to the tray mounting plate by means of a pair of parallel, horizontally grooved members, affixed to the underside of the first tray, which engage opposing edges of the tray mounting plate. Preferably the horizontally grooved members are positioned to engage the side edges of the tray mounting plate so as to permit fore and aft movement of the first tray, although side to-side movement of the first tray may be used if desired. A second tray, or overtray may be similarly attached to the first tray, so as to allow the second tray to move orthogonally to the movement of the first tray. Thus, in the preferred embodiment, the second tray is adjustable from side-to-side upon the first tray, which, in turn, is adjustable forward and backward upon the tray mounting plate, providing four-direction adjustability of the second tray upon the tray mounting plate.

The tray assembly may be supported by mounting posts installed on either the right or left side of the wheel chair as desired. When maximum support is required, support from both sides of the wheel chair may be used, utilizing a second mounting post and vertical and horizontal support members. The second horizontal support member is attached by means of a retracting bolt to the first horizontal support member at the tray mounting plate.

DESCRIPTION OF THE PREFERRED EMBODIMENT

Figure 1:
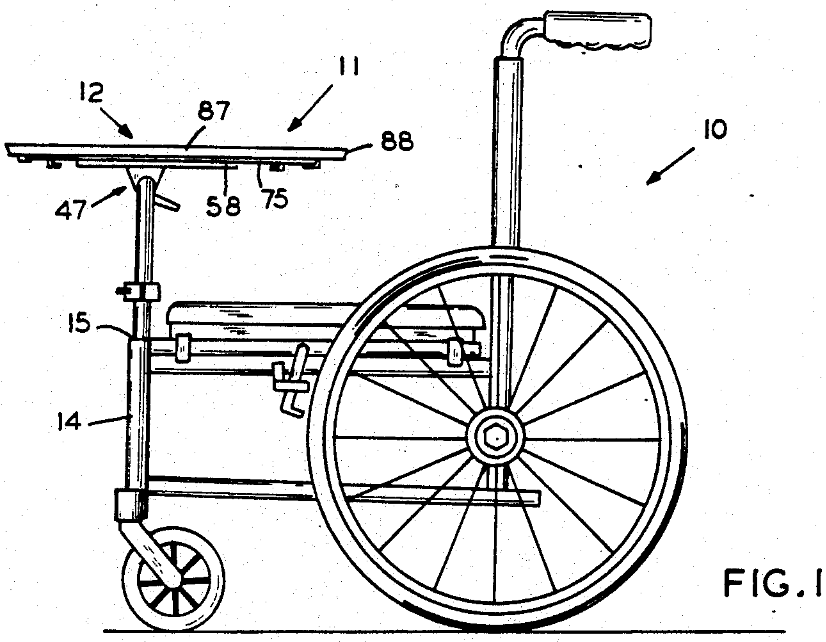
FIG. 1 illustrates a side view of a wheel chair with a tray assembly for wheel chairs mounted thereon in a horizontal position.
Figure 2:
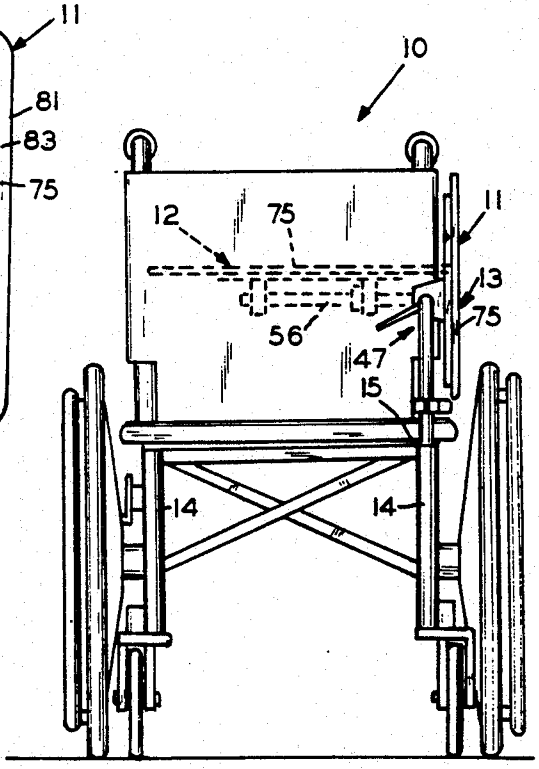
FIG. 2 illustrates a front view of the wheel chair of FIG. 1 with a tray assembly for wheel chairs shown in a vertical, off-to-the-side, storage position, and in a horizontal, in-use, position in dashed lines.

Turning now to the drawings, there is shown in FIG. 1 a side view of a wheel chair 10 with a tray assembly 11 mounted thereon in a normal in-use position 12. FIG. 2 is a front view of the wheel chair 10 and tray assembly 11 showing the tray assembly 11 rotated to an out-of-the-way storage position 13 with the normal in-use position 12 shown in dashed lines.

Figure 9:
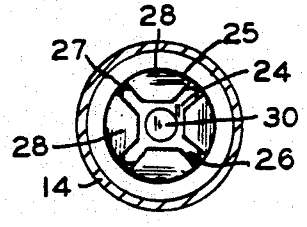
FIG. 9 illustrates an end view of the stem, as seen at line 9—9 of FIG. 4.

The tray assembly 11 is mounted utilizing a front vertical tubular frame member 14 of the wheel chair 10 whose upper end opening 15 is or may be exposed. A stem connecting member 16 is inserted within the opening 15 and locked into position. The stem connecting member 16 preferably is formed of three sections of tubing, an upper section 17 having an angled lower end 18, a middle section 19, having an angled upper end 20 and an angled lower end 21, and a lower section 22 having an angled upper end 23. The angled ends 18, 20 and 21, 23 which will, upon tightening, abut each other, are preferably angled equally at approximately 45-degrees. A nut 24 is fixed at the lower end 25 of the lower section 22. While welding of nut 24 to the lower end 25 of the lower section 22 is satisfactory, a preferred means of attaching the nut 24, as seen at FIG. 9, is by forming slots 26 in the lower end 25 of lower section 22, inserting the nut 24 so that its corners 27 extend within the slots 26 to prevent rotation of the nut 24, and then crimping the prongs 28 inward to hold the nut 24 in position. An elongated bolt 29, threaded at least at its lower portion 30, is supported at the upper end 31 of the upper section 17 and extends downward to engage the nut 24 at the lower end 25 of the lower section 22. As the bolt 29 is tightened, the angled upper end 23 of the lower section 22 and the angled lower end 21 of the middle section 19 will attempt to slide by each other, thereby increasing a transverse dimension 32 thereat. If the lower end 33 of the stem connecting member 16 is inserted into the opening 15 of a front vertical tubular frame member 14, subsequent tightening of the bolt 29 will effectively lock the lower end 33 of the stem connecting member 16 at a fixed position within the tubular frame member 14. A similar fixing occurs when a tubular mounting post 34 is placed over the upper end 35 of the stem connecting member 16, wherein tightening increases a transverse dimension 36 so as to wedge the lower end 18 of the upper section 17 and the upper end 20 of the middle section 19 into a fixed position. It has been found advantageous to form the upper end 20 and lower end 21 of the middle section 19 in generally parallel planes, such orientation providing a tighter, more secure locking action. When the lower end 33 of the stem connecting member 16 is inserted within the wheel chair 10 frame member 14 and a tubular mounting post 34 is slipped over the upper end 35 of the stem connecting member 16, upon tightening the bolt 29, the lower end 33 of the stem connecting member 16 is fixed to the wheel chair 10, and the tubular mounting post 34 is fixed concentrically about the stem connecting member 16.

A predetermined position for the stem connecting member 16 within the wheel chair 10 frame member 14 is obtained by limiting the depth to which an untightened stem connecting member 16 may be inserted. This may be simply done by inserting a spring clip 37 into an accommodating groove 38 formed about the middle section 19 of the stem connecting member 16, the spring clip 37 abutting the upper end opening 15 of the frame member 14 upon insertion. A preferred mounting post 34 will enclose the upper end 35 of the stem connecting member 16 except for the head 39 of the bolt 29, it being desired that the bolt head 39 be exposed to facilitate tightening and loosening of the stem connecting member 16.

Figure 10:
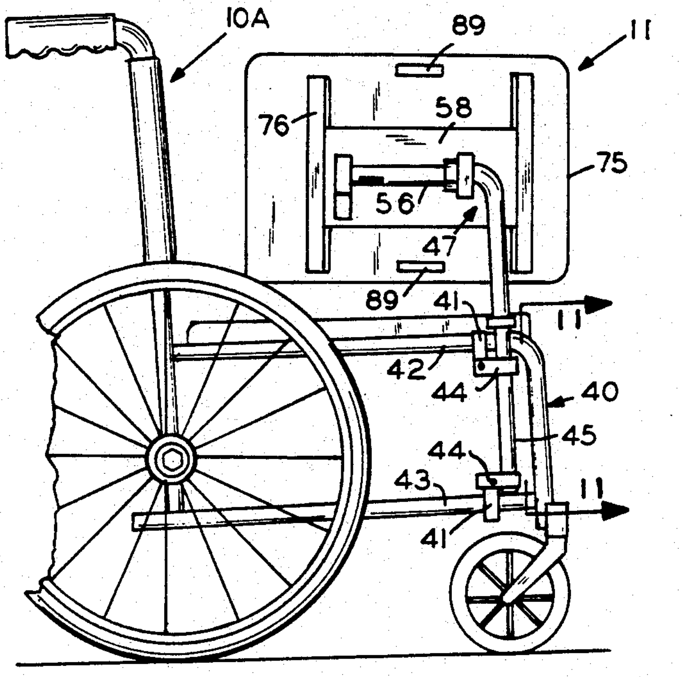
FIG. 10 illustrates a side view of a wheel chair with a tray assembly mounted by an alternative means to the wheel chair.
Figure 11:
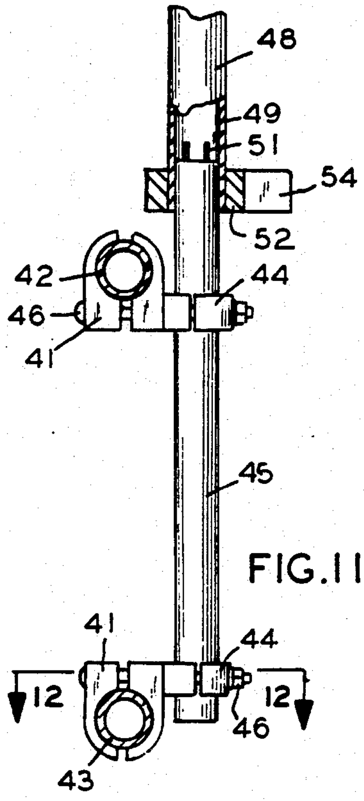
FIG. 11 illustrates a front view of the alternative mounting means of FIG. 10, as seen at line 11—11 of FIG. 10.
Figure 12:
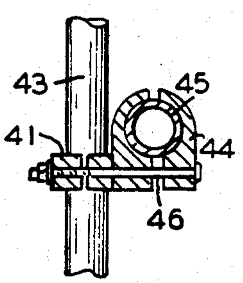
FIG. 12 illustrates a sectional view, as seen at line 12—12 of FIG. 11.
Figure 14:
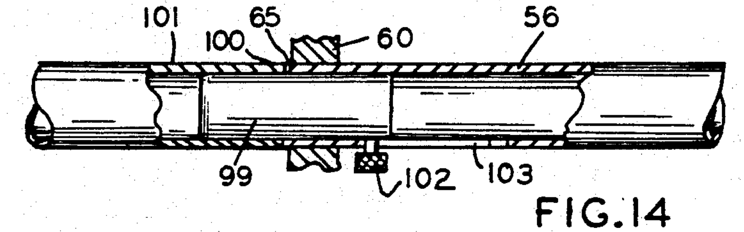
FIG. 14 illustrates a sectional view, as seen at line 14—14 of FIG. 13.

For those wheel chairs 10A where an open front vertical tubular frame member 14 is not available for insertion of the above described stem connecting member 16, an alternative means of mounting 40 may be required. One such alternative means of mounting 40, as best seen in FIGS. 10–12, utilizes two clamping members 41 which are designed to clampingly engage vertically-spaced, horizontal wheel chair 10A frame members 42 and 43 in conjunction with an encircling band member 44 about a mounting post 45 which is oriented vertically. Preferably, each clamping member 41 and band member 44 combination are tightened by a common bolt 46, whereby the bolt 46 itself provides a mechanical link between the horizontal frame members 42, 43 and the vertical tubular mounting post 45. It should be noted that in FIGS. 1 and 2 the stem connecting member 16 means of mounting is at the left side of the wheel chair 10 while in FIG. 10, the alternative means of mounting 40 is attached at the right side. Either side of the wheel chair 10, 10A is available for mounting of the tray assembly 11, as the user desires.

A suitable means of vertical tubular mounting having been achieved, with either a stem connecting member 16 having been installed with tubular mounting post 34 locked in place, or tubular mounting post 45 having been clamped in position, the remainder of the tray assembly 11 for wheel chairs 10 may be installed.

Figure 4:
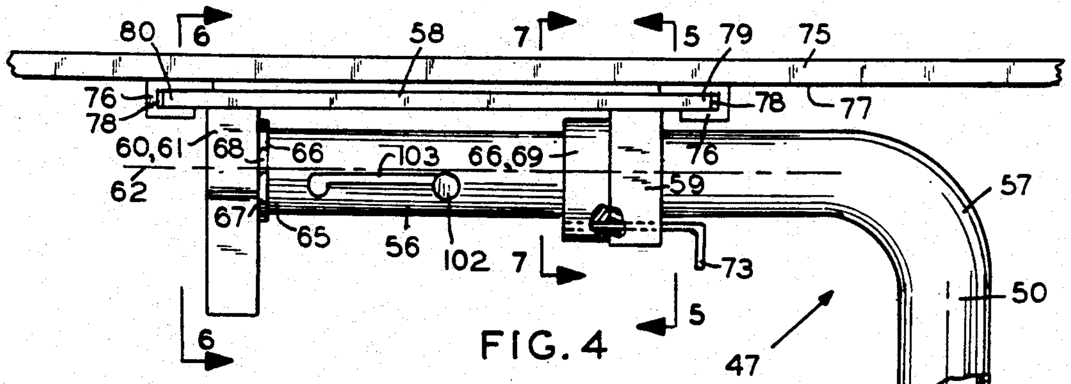
FIG. 4 illustrates a partially sectioned side elevation view of the tray assembly for wheel chairs.
Figure 5:
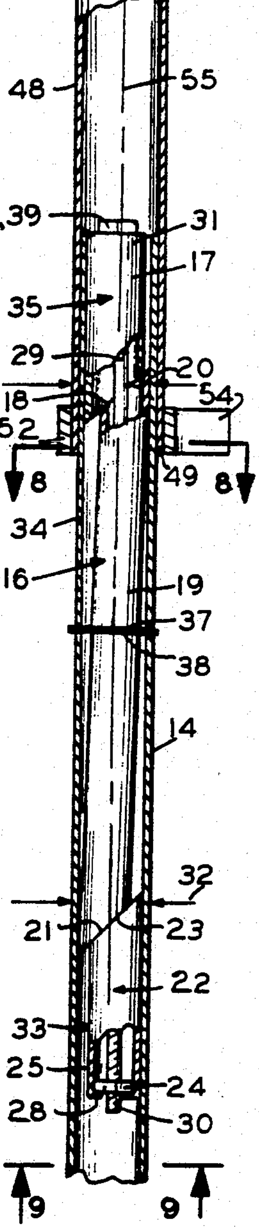
FIG. 5 illustrates a sectional view, as seen at line 5—5 of FIG. 4.
Figure 5:
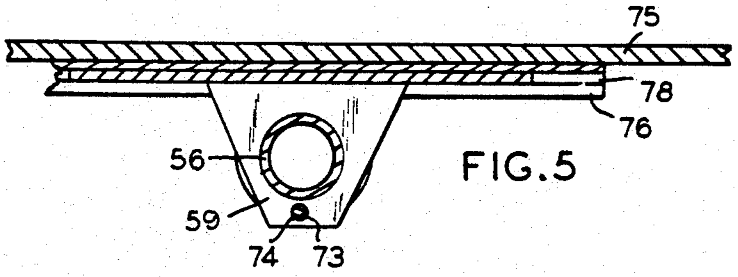

FIG. 4, for illustrative purposes, shows the use of tubular mounting post 34 fixed on stem connecting member 16, it being clear that tubular mounting post 45, fixed to the wheel chair 10 by clamping members 41, is interchangeable with tubular mounting post 34 in the subsequent description.

A tray support member 47 includes a vertical support member 48 and a horizontal support member 56. The vertical support member 48 has an inside diameter which is slightly greater than the outside diameter of the tubular mounting post 34, so as to allow the lower end 49 of the vertical support member 48 to snugly fit thereabout while permitting both rotational 92 and vertical 91 movement of the vertical support member 48 upon the tubular mounting post 34. The lower end 49 of the vertical support member 48 is formed with longitudinal slots 51 so as to provide, in combination with an encircling clamp 52, means for locking the vertical support member 48 in a fixed position upon the mounting post 34. The preferred clamp 52 is a split band 53, formed of a smooth resilient material such as nylon, which is tightened or loosened by the rotation of a camming lever 54. The tightening of clamp 52 compresses the slotted lower end 49 of the vertical support member 48 about the tubular mounting post 34 at the height and rotational position desired. When the clamp 52 is loosened, the vertical support member 48 may be rotated 360-degrees about its vertical axis 55 upon the tubular mounting post 34 or may be adjusted vertically from a position wherein the lower end 49 of the vertical support member 48 abuts the vertical tubular frame member 14 of the wheel chair 10 to a position where the vertical support member 48 is physically lifted off the mounting post 34.

A horizontal support member 56 joins the upper end 50 of the vertical support member 48, extending at a right angle thereto. While the horizontal support member 56 and the vertical support member 48 may be separate members appropriately joined to form a tray support member 47, the preferred structure is to use a 90-degree tubular elbow 57.

The horizontal support member 56 is rotatingly attached to a tray mounting plate 58 by means of two encircling members, a tray mount block 59 and a tray clamp block 60. The tray mount block 59, preferably formed of nylon, is fixedly attached to the tray mounting plate 58 and supported by the horizontal support member 56.

Figure 6:
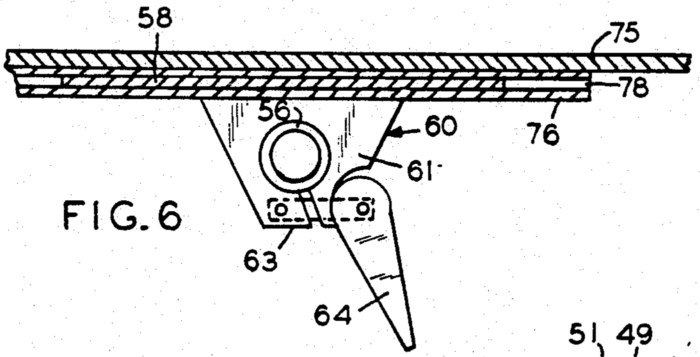
FIG. 6 illustrates a sectional view, as seen at line 6—6 of FIG. 4.
Figure 7:
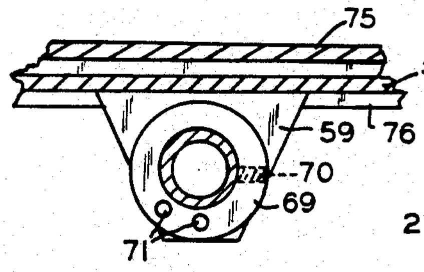
FIG. 7 illustrates a sectional view, as seen at line 7—7 of FIG. 4.
Figure 8:
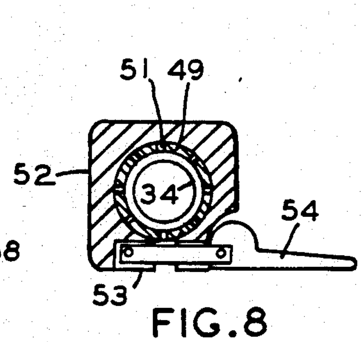
FIG. 8 illustrates a sectional view of a clamp, as seen at line 8—8 of FIG. 4

The tray clamp block 60, in the form of an encircling clamp member 61 also is fixedly attached to the tray mounting plate 58 to permit rotation of the tray mounting plate 58 about the axis 62 of the horizontal support member 56. The clamp member 61, as seen at FIG. 6, is of similar construction to the clamp 52 wherein a split band 63 is tightened or released by rotation of camming lever 64.

The clamp member 61, provides encircling support at the end 65 of the horizontal support member 56. The tray mounting plate 58 is fixed at a longitudinal position upon the horizontal support member 56 by stops 66 located on the inward sides of the tray mount block 59 and the tray clamp block 60. Stop 66 may be provided by a spring clip 67 engaging an accommodating groove 68 in the horizontal support member 56, as shown in FIG. 4. Continuous rotational positioning of the tray mounting plate 58 about the horizontal axis 62 of the horizontal support member 56 may be obtained by means of the clamp member 61. Alternatively, several specific rotational locations may be utilized wherein, in lieu of a spring clip 67 located to the inside of the tray mount block 59, a lock collar 69, fixed on the horizontal support member 56, as by a set screw 70, may include one or more apertures 71 about its periphery which are formed to engage a pin 73 inserted through an aperture 74 in the tray mount block 59, each aperture 71 location corresponding to a predetermined tray angle. In the preferred embodiment, collar 69 apertures 71, in combination with tray mount block 59 aperture 74, are located so as to correspond to a level tray mounting plate 58 and to a 30degree-tray inclination (not shown), respectively, have been found to work well, although additional apertures 71 for different angles also may be desired.

A first tray or undertray 75 is formed to engage the tray mounting plate 58 so as to provide a linearly variable position of the undertray 75 relative to the tray mounting plate 58 Such linearly variable positioning may be obtained by utilizing undertray tracks 76 of generally U-shaped cross section which are affixed to the bottom 77 of the undertray 75 with the longitudinal openings 78 facing inwards and spaced so as to slidingly engage the tray mounting plate 58 on opposing sides 79, 80. In the preferred embodiment of the undertray 75, the undertray tracks 76 are positioned to allow front to back linear movement 94, that is, forward away from or back towards a seated user. A preferred undertray 75 is formed of ⅛-inch thick tempered hardboard with a length of 14 inches and a width of 11½-inches and is flat so as to receive an overtray 81, as described below.

A second tray or overtray 81 may be provided which slidingly engages upon the undertray 75 so as to provide linear movement in a direction perpendicular to the direction of movement of the undertray 75 upon the tray mounting plate 58. This is achieved through the attachment of U-shaped overtray tracks 82 upon the bottom 83 of the overtray 81, with the longitudinal openings 84 of the U-shaped tracks 82 facing inwards towards the smaller undertray 75 thereby slidingly engaging the undertray 75 on opposing sides 85, 86 to allow linear side-to-side movement 95 of the overtray 81 upon the undertray 75.

The preferred undertray tracks 76 and overtray tracks 82 are made of resilient plastic which is formed to pinch or grasp the tray mounting plate 58 and undertray 75 respectively. An excellent, readily available, track 76, 82 material is the cap mold which is applied to protect and seal the edges of shower boards.

The form of the overtray 81 may take various shapes. Currently preferred are a larger flat table-like sheet of ⅛-inch tempered hardboard (not shown), or, alternatively, a dinner-type tray 87, conventionally approximately 20-×15-inches with an outer edge 88 extending upwardly approximately one-inch. Generally the overtray 81 will be removable from the undertray 75 by continuing its linear movement 95 until the overtray tracks 82 become disengaged. However, it generally is preferable for the undertray 75 to be retained upon the tray mounting plate 58, this being accomplished by one or more stops 89 formed on the bottom 77 of the undertray 75 which limit linear movement past the undertray tracks 76. The stops 89 may be formed of the same U-shaped material as the undertray tracks 76, so that, at a limiting position, a stop 89 also will assist in supporting the undertray 75.

Figure 3:
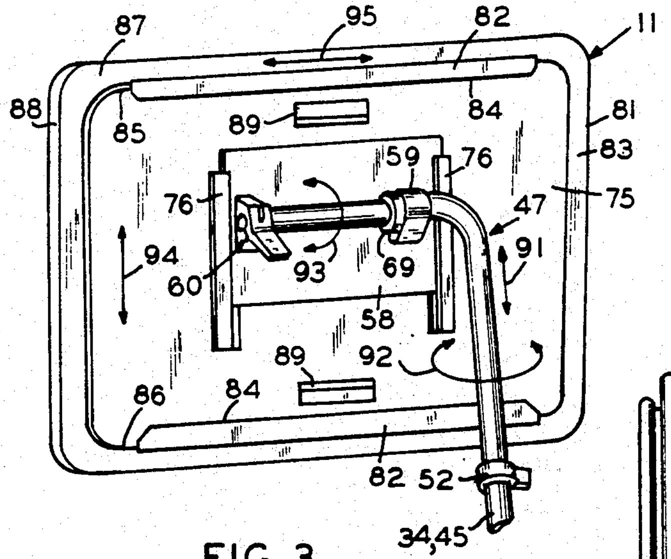
FIG. 3 illustrates diagrammatically the various freedoms of movement of the tray assembly which are available to the user.

As best seen in FIG. 3, the tray assembly 11 for wheel chairs 10, provides wheel chair trays 75, 81 which have multiple potential positions so as to provide the user with both maximum flexibility and convenience. The position of the tray support member 47 and thus tray mounting plate 58 may be adjusted vertically 91 at, and rotated 92 about, the mounting post 34 attached to the wheel chair 10. Additionally, the tray mounting plate 58 may be rotated 93 about the horizontal axis 62 of the horizontal support member 56. The combination of rotations 92 and 93 allows the tray mounting plate 58, and attached undertray 75, to be located in front of a seated user for use, or may be rotated out of the way to a vertical side position 13 which is convenient for storage, as seen at FIGS. 2 and 9. Front-to-back linear movement 94 is available to vary the position of the undertray 75 upon the tray mounting plate 58, to allow the undertray 75 to be adjusted closer or further away from the seated user. If the overtray 81 is used, side-to-side linear movement 95 also is available. Of course, as a result of rotational movement 92, the undertray 75 and/or overtray 81 simply may be rotated horizontally completely out of the way from in front of the seated user. It also is possible, by rotation 92 and linear movement 94, to position the undertray 75 to the side of the user.

Figure 13:
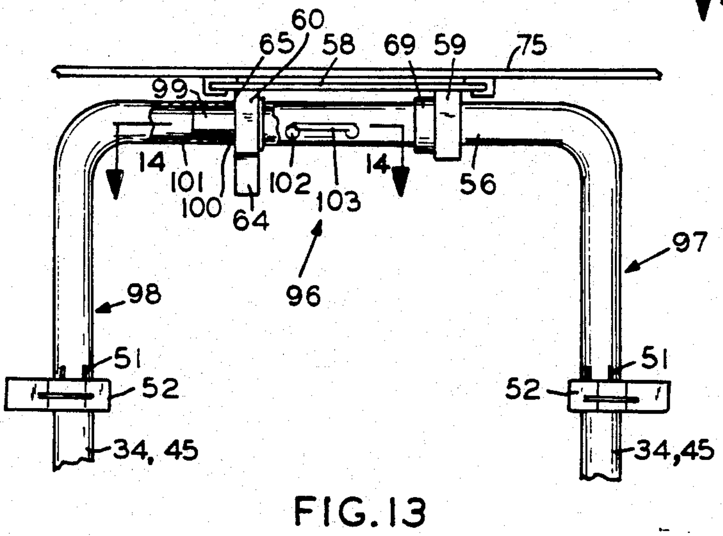
FIG. 13 illustrates a front view of the tray assembly utilizing dual mounting means.

While the tray assembly 11 is designed for support by a first mounting structure 97, e.g., single mounting post 34 or 45 and tray support member 47, it may be desirable, if additional sturdiness is required, to provide a second mounting structure 98, thereby forming a U-shaped support 96 extending from the wheel chair 10 as shown in FIG. 12.

Where a second mounting structure 98 is used, the mounting means to the wheel chair 10 is merely duplicated on the other side, e.g., use of the other open front vertical tubular frame member 14 or the alternative frame mounting 40, as described above. Since the position of the second mounting structure 98 normally is fixed in relationship to the wheel chair 10, it is necessary to provide means for attachment of the second mounting structure 98 to the horizontal support member 56 of the first mounting structure 97. This is accomplished by providing an interior bolt 99, in the form of a cylinder, at the end 65 of the horizontal support member 56, which has two positions: a retracted position wherein the bolt 99 does not extend from the end 65 of the horizontal support member 56, and an extended, supporting position wherein the bolt 99 extends to within the horizontal end 100 of a second horizontal support member 101, which is part of the second mounting structure 98, to provide the connecting means by which the second mounting structure 98 provides support. Thus, in the process of engaging the second mounting structure 98, the bolt 99 is retracted within the end 65 of the first mounting structure 97, the retracted position, as seen in FIG. 4, preferably being the normal single-support position, and the horizontal end 100 of the second horizontal support member 101 is moved to be aligned with and abut the end 65 of the first horizontal support member 56, at which time the bolt 99 is extended outwardly to engage the end 100 of the second horizontal support member 101 and locked into position. Locking is achieved by a pin 102, attached to the bolt 99, which extends through and is guided within a U-shaped slot 103 in the horizontal support member 56 as best seen at FIG. 13. Preferably the second horizontal support member 101 engages the first horizontal support member 56 at either the tray mount block 59 or the tray clamp block 60, so that the bolt 99 directly transfers weight from the tray mounting plate 58 to the second mounting structure 98.

Additionally, it is clear that the tray assembly 11 may also be mounted on structures other than wheel chairs 10, such as beds, where the advantages of multiple tray positions would also be available.

It is thought that the tray assembly 11 for wheel chairs of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A tray assembly for wheel chairs, comprising:

a. a tray, having an upper surface defining a plane;

b. a tray support member, having a vertical axis and a horizontal axis, which includes:

(1) a horizontal support member and a vertical support member in the form of a monolithic tubular section which is shaped in a right angle bend, and formed so that one end provides said horizontal axis and the other end provides said vertical axis;

(2) said vertical support member concentrically and telescopically engaging a mounting post;

(3) said concentric, telescopic engagement providing means for rotating said tray support member about said vertical axis of said tray support member to a plurality of rotational positions and also providing means for positioning said tray support member along said vertical axis at a plurality of vertical positions;

(4) said tray support member being fixable at desired rotational and vertical positions by clamping means;

c. means for mounting said tray support member upon a wheel chair;

d. means for attaching said tray to said tray support member which includes:

(1) a tray support plate, having a lower surface with at least one mounting block which is secured upon said lower surface and which circumferentially engages said tray support member about said horizontal support member;

(2) means for rotating said tray about said horizontal axis of said tray support member which include a clamping block, secured upon said lower surface of said tray support plate, which releasingly engages said horizontal support member, said releasing engagement permitting continuous positioning of said tray about said horizontal axis;

e. means for positioning said tray at a plurality of positions within the plane of said tray which include:

(1) a pair of generally U-shaped elongated tracks affixed to a bottom surface of said tray in a spaced, parallel arrangement so as to engage about opposing edges of said tray support plate, thereby allowing linear movement of said tray upon said tray support plate which is parallel to said tracks; and (2) additionally includes a second tray, said second tray having a second pair of generally U-shaped tracks affixed to a bottom surface of said second tray in a spaced, parallel arrangement which is perpendicular to the first pair of tracks affixed to the bottom surface of the first tray, so that said second tray engages about opposing edges of said first tray, thereby allowing linear movement of said second tray upon said first tray which is additional and orthogonal to said movement of said first tray upon said tray support plate.

2. A tray assembly for wheel chairs, as recited in claim 1, wherein, in addition to said continuous positioning of said tray about said horizontal support member, there are included means for fixing one or more rotational positions of said tray about said horizontal support member which include a collar fixed to said horizontal support member and having at least one aperture formed therein, said mounting block having a corresponding aperture, said apertures of said collar and said mounting block being formed for aligned engagement by a pin member so as to fix a rotational position of the tray relative to the horizontal support member.

3. A tray assembly for wheel chairs, comprising;

a. a tubular vertical support member having a longitudinal axis;

b. means for mounting said vertical support member upon the wheel chair;

c. a tubular horizontal support member having a longitudinal axis, connected to said vertical support member, which horizontal support member is capable of rotation about said longitudinal axis of said vertical support member:

d. means for fixing and releasing the position of said horizontal support member relative to said longitudinal axis of said vertical support member;

e. means for vertically adjusting the position of said horizontal support member upon the wheel chair;
f. a tray support plate attached parallel to said horizontal support member;
g. means of adjustably rotating said tray support plate to various positions about said longitudinal axis of said horizontal support member;
h. a first tray;
i. means of slidingly attaching said first tray to said tray support plate to permit movement in a first linear direction;
j. a second tray;
k. means of slidingly attaching said second tray to said first tray to permit movement in a second linear direction which is orthogonal to said first linear direction;
l. said second tray being repositionable in said first linear direction by adjustment of the position of said first tray upon said tray support member, and being repositionable in said second linear direction by adjustment of the position of said second tray upon said first tray.

4. A tray assembly for wheel chairs, as recited in claim 3, where the wheel chair has an open tubular vertical member, the means for mounting the vertical support member upon the wheel chair includes;
a. a stem connecting member comprising a first tubular member having a first end and a second end which is slanted, a second tubular member having a first end which is slanted corresponding to the second end of the first tubular member and a second end which is slanted, a third tubular member having a first slanted end corresponding to said second end of said second tubular member and a second end, and a threaded member extending from the first end of said first tubular member to a nut engaging the second end of the third tubular member;
b. wherein rotation of said threaded member pulls said first, second, and third tubular members together, causing a first lateral slippage between said corresponding slanted ends of said first and second tubular members and a second lateral slippage between said correspondingly slanted ends of said second and third tubular members, said second lateral slippage causing said stem connecting member to become transversely wedged within said open tubular vertical frame member of the wheel chair and said first lateral slippage causing said stem connecting member to become transversely wedged within a mounting post extending vertically above said vertical frame member;
c. a tubular vertical support member of greater diameter than said mounting post, having a slotted lower end upon which a lever releasable camming clamp is located, said tubular vertical support member concentrically and telescopically engaging said mounting post so that said vertical support member may be adjusted vertically upon said mounting post or may rotate about the vertical axis of said vertical support member.

5. A tray assembly for wheel chairs, as recited in claim 3, where, additionally, there is a second tubular vertical support member, mounted upon said wheel chair at a position which opposes the mounting position of the first vertical support member, the second vertical support member also engaging and supporting the horizontal support member at a location remote from the first vertical support member, so that the horizontal support member is supported at both ends for additional stability.

6. A tray assembly for wheel chairs, as recited in claim 3, where said first tray has fixedly attached to a bottom surface thereof, two parallel track members which are spaced according to a first width of said tray support plate, so that opposing sides of said tray support plate will support said first tray within said track members so as to permit sliding linear movement of said first tray upon said tray support plate.

7. A tray assembly for wheel chairs, as recited in claim 3, where said second tray member has fixedly attached to the bottom surface thereof, two parallel track members which are . spaced according to a first width of said first tray member, so that opposing sides of said first tray will support said second tray within said track members so as to permit sliding linear movement of said second tray upon said first tray.

8. A tray assembly for wheel chairs, comprising:
a. a tray, having an upper surface defining a plane;
b. a tray support member having a vertical axis and a horizontal axis;
c. means for mounting said tray support member upon a wheel chair, including a mounting post fixedly attached to said wheel chair, wherein, said wheel chair having an open vertical frame member, said mounting post is secured to said wheel chair by means of a stem connecting member which, upon tightening, concurrently expands laterally within said vertical frame member and within said mounting post so as to secure said mounting post onto said vertical frame member in a vertical position;
d. means for rotating said tray support member about said vertical axis of said tray support member;
e. means for positioning said tray support member at a plurality of vertical positions along said vertical axis of said tray support member;
f. means for attaching said tray to said tray support member;
g. means for rotating said tray about said horizontal axis of said tray support member;
h. means for positioning said tray at a plurality of positions within the plane of said tray.

9. A tray assembly for wheel chairs, as recited in claim 8, wherein:
a. said tray support member includes a horizontal support member and a vertical support member;
b. said vertical support member concentrically and telescopically engages said mounting post;
c. said concentric, telescopic engagement providing said means for rotating said tray support member about said vertical axis of said tray support member to a plurality of rotational positions and also providing said means for positioning said tray support member along said vertical axis at a plurality of vertical positions;
d. said tray support member being fixable at desired rotational and vertical positions by clamping means.

10. A tray assembly for wheel chairs, as recited in claim 9, where said tray support member is a monolithic tubular section which is shaped in a right angle bend, and formed so that one end provides said horizontal support member axis and the other end provides said vertical support member.

11. A tray assembly for wheel chairs, as recited in claim 9, where said means for attaching said tray to said tray support member includes a tray support plate, having a lower surface, with at least one mounting block which is secured upon said lower surface and which circumferentially engages said tray support member about said horizontal support member.

12. A tray assembly for wheel chairs, as recited in claim 11, where said means for rotating said tray about said horizontal axis of said tray support member includes a clamping block, secured upon said lower surface of said tray support plate, which releasingly engages said horizontal support member, said releasing engagement permitting continuous positioning of said tray about said horizontal axis.

13. A tray assembly for wheel chairs, comprising:

a. a tray, having an upper surface defining a plane;

b. a tray support member, having a vertical axis and a horizontal axis, which includes a horizontal support member and a vertical support member; said vertical support member concentrically and telescopically engaging a mounting post; said concentric, telescopic engagement providing means for rotating said tray support member about said vertical axis of said tray support member to a plurality of rotational positions and also providing means for positioning said tray support member along said vertical axis at a plurality of vertical positions; said tray support member being fixable at desired rotational and vertical positions by clamping means;

c. means for mounting said tray support member upon a wheel chair, including said mounting post fixedly attached to said wheel chair;

d. means for attaching said tray to said tray support member which include a tray support plate, having a lower surface, with at least one mounting block which is secured upon said lower surface and which circumferentially engages said tray support member about said horizontal support member;

e. means for rotating said tray about said horizontal axis of said tray support member which include a clamping block, secured upon said lower surface of said tray support plate, which releasingly engages said horizontal support member, said releasing engagement permitting continuous positioning of said tray about said horizontal axis; and f. means for fixing one or more rotational positions of said tray about said horizontal support member which include a collar, having at least one aperture formed therein, fixed to said horizontal support member, said mounting block having a corresponding aperture, said apertures of said collar and said mounting block being formed for aligned engagement by a pin member so as to fix a rotational position of the tray relative to the horizontal support member.

14. A tray assembly for wheel chairs, comprising:

a. a tray, having an upper surface defining a plane;

b. a tray support member, having a vertical axis and a horizontal axis, which includes a horizontal support member and a vertical support member; said vertical support member concentrically and telescopically engaging a mounting post; said concentric, telescopic engagement providing means for rotating said tray support member about said vertical axis of said tray support member to a plurality of rotational positions and also providing means for positioning said tray support member along said vertical axis at a plurality of vertical positions; said tray support member being fixable at desired rotational and vertical positions by clamping means;

c. means for mounting said tray support member upon a wheel chair, including said mounting post fixedly attached to said wheel chair;

d. means for attaching said tray to said tray support member which include a tray support plate, having a lower surface, with at least one mounting block which is secured upon said lower surface and which circumferentially engages said tray support member about said horizontal support member; and e. means for positioning said tray at a plurality of positions within the plane of said tray which include a pair of elongated tracks affixed to a bottom surface of said tray in a spaced, parallel arrangement so as to engage said tray support plate, thereby allowing linear movement of said tray upon said tray support plate which is parallel to said tracks.

15. A tray assembly for wheel chairs, as recited in claim 14, where said elongated tracks affixed to the bottom surface of said tray are generally U-shaped and oriented to engage about opposing edges of said tray support plate.

16. A tray assembly for wheel chairs, as recited in claim 14, wherein said means for adjusting a tray to a plurality of positions within the plane of said tray additionally include a second tray having a second pair of tracks affixed to a bottom surface of said second tray in a spaced, parallel arrangement which is perpendicular to the first pair of tracks affixed to the bottom surface of the first tray, so hat said second tray may engage said first tray, thereby allowing linear movement of said second tray upon said first tray which is additional and orthogonal to said movement of said first tray upon said tray support plate.

17. A tray assembly for wheel chairs, as recited in claim 16, wherein said second pair of tracks affixed to the bottom surface of said second tray are generally U-shaped and are oriented to engage about opposing edges of said first tray.

* * * * *